(12) United States Patent
Gueller et al.

(10) Patent No.: US 8,478,973 B2
(45) Date of Patent: Jul. 2, 2013

(54) SYSTEM AND METHOD FOR PROVIDING A SECURE APPLICATION FRAGMENTATION ENVIRONMENT

(75) Inventors: Markus Gueller, Stadtbergen (DE); Harald Hewel, Aichach (DE)

(73) Assignee: Infineon Technologies AG, Neubiberg (DE)

( * ) Notice: Subject to any disclaimer, the term of this patent is extended or adjusted under 35 U.S.C. 154(b) by 865 days.

(21) Appl. No.: 12/130,374

(22) Filed: May 30, 2008

(65) Prior Publication Data

US 2009/0300366 A1    Dec. 3, 2009

(51) Int. Cl.
*G06F 9/00* (2006.01)
*G06F 11/30* (2006.01)
*G06F 13/00* (2006.01)
*H04L 29/06* (2006.01)

(52) U.S. Cl.
USPC ............... 713/1; 713/155; 713/189; 711/103; 711/154

(58) Field of Classification Search
USPC ................ 713/1, 155, 189; 711/103, 154
See application file for complete search history.

(56) References Cited

U.S. PATENT DOCUMENTS

| | | | |
|---|---|---|---|
| 4,794,524 A * | 12/1988 | Carberry et al. | 712/32 |
| 6,594,723 B1 * | 7/2003 | Chapman et al. | 711/103 |
| 6,986,052 B1 * | 1/2006 | Mittal | 713/190 |
| 7,577,832 B2 * | 8/2009 | Wisecup et al. | 713/2 |
| 2003/0208680 A1 * | 11/2003 | Byrne et al. | 713/179 |
| 2006/0117177 A1 | 6/2006 | Buer | |
| 2007/0220243 A1 * | 9/2007 | Mahmoud | 713/1 |
| 2008/0084273 A1 | 4/2008 | Rodgers et al. | |
| 2009/0043972 A1 * | 2/2009 | Kamiko et al. | 711/154 |
| 2011/0010299 A1 * | 1/2011 | Byrne et al. | 705/59 |

* cited by examiner

*Primary Examiner* — Teshome Hailu
(74) *Attorney, Agent, or Firm* — Slater & Matsil L.L.P.

(57) ABSTRACT

System and method for providing and using expanded memory resources secure application environment is disclosed. An embodiment comprises a system and method for providing secure application functionality comprising receiving a request for a secure operation; determining if required application code for the secure operation is present in an application fragment store; sequentially loading a plurality of fragments of the required application code from an external memory, if the required application code is not present in the application fragment store; sequentially executing the plurality of fragments of the required application code; and sending a reply to the request for the secure operation. The system and method may further comprise decrypting each of the plurality of fragments of the required application code using a secure key prior to execution of the fragment and verifying the integrity of the code fragment.

24 Claims, 4 Drawing Sheets

SYSTEM AND METHOD FOR PROVIDING A SECURE APPLICATION FRAGMENTATION ENVIRONMENT

TECHNICAL FIELD

The present invention relates generally to a system and method for providing a secure application environment and, more particularly, to a system and method for providing expanded memory resources for use in secure application environment.

BACKGROUND

Security is a key design challenge for most systems and applications. Attacks and unauthorized access to a system can lead to the loss of critical data, network downtime, and lost productivity and revenue. There is often a need to authenticate users and to protect network infrastructure and the associated users via private keys and certificates to provide security.

A Trusted Platform Module (TPM) that complies with the specifications published by the Trusted Computing Group (TCG) is a microcontroller security chip that may be used to defend the internal data structures against attacks. The TPM security chip ensures that the stored information, such as keys, passwords and digital certificates, is secure from external software attacks and physical theft by performing cryptographic functions on the chip. TPM may be integrated into the boot process to establish a trust level and to gather measurement about the running environment for trusted reporting. A TPM chip may be affixed to the motherboard of a computing system to provide this functionality.

The TPM chip stores keys, passwords and digital certificates. The nature of the device—i.e. a silicon-based microcontroller—ensures that the stored information is secure from external software attack and physical theft. Security processes, such as digital signature and key exchange, are protected through subsystems on the chip. Access to data and secrets on a platform may be denied, for example, if a system boot sequence is not as expected by the TPM chip. Critical applications and capabilities, such as secure email, secure web access and local protection of data are thereby made much more secure.

One limitation of TPM chips is an inability to expand or upgrade memory size if needed, for example, due to a new secure application, a change in the size of an existing secure application, or storage of additional secure data to be processed by the TPM chip. TPM typically has a passive role in a system. The TPM chip does not select what software it runs, but instead acts as a slave to higher level applications by storing and reporting pre-runtime configuration information. Typical TPM chips use their own internal firmware and logic circuits for processing instructions, and do not rely upon the underlying system.

Similarly, the Mobile Trusted Module (MTM) is a newly approved TCG specification for use in mobile and embedded devices. MTM originates from TPM v. 1.2, and introduces a secure boot concept. MTM also supports implementation as a functionality rather than as a physical implementation in hardware, which makes it possible for device manufacturers to add the MTM to already deployed, proprietary security solutions.

SUMMARY OF THE INVENTION

These and other problems are generally solved or circumvented, and technical advantages are generally achieved, by embodiments of the present invention which stores secure application code and data in off-chip resources. Only fragments or portions of the secure application code or data are loaded to the chip as needed or on-demand to provide requested secure application functionality.

Secure applications, such as TPM 1.2 and MTM, may be executed in isolated execution environments, such as within a security integrated circuit (Security IC). The complete secure application may be provided via program logic implemented in internal secure memory resources, such as ROM, RAM or other non-volatile memory (NVM), or may be statically loaded from standard external memory resources, such as Flash memory, into the internal secure memory resources. The secure internal memory resources usually represent the complete secure application logic. Typically, when the secure application functionality is increased, the secure internal memory resources also need to be increased. Additionally, the process of loading the secure application from standard external memory resources usually imposes some requirements on the minimum size of the internal secure memory resources.

Embodiments of the present invention provide an isolated execution environment design in which the required secure internal memory resources are optimized to a minimum size.

Embodiments of the invention further provide a design in which the size of the secure internal memory resources may be kept at a minimum and still support the desired functionality, even if the secure application functionality is later enhanced or expanded.

Prior upgrades to applications within isolated execution environments have required increasing the size of the secure internal memory resources or loading the complete secure applications from standard external memory. As a result, the cost of the isolated execution environment system is increased due to the higher costs for the secure internal memory.

Embodiments of the invention provide a secure application environment that requires a minimum amount of secure internal memory resources. Embodiments of this environment may be referred to as a secure application fragmentation environment (SAFE). In one embodiment, the complete functionality of the secure application may be stored on standard external memory resources and loaded dynamically during runtime based on an application fragmentation algorithm. The application and data may be loaded securely into the SAFE with the application's integrity and confidentiality protected.

The application fragmentation algorithm may be based on various policies. The fragmented application may be executed from an internal secure memory resource within an isolated execution environment in one embodiment. The application fragmentation algorithm ensures that any code that is required to fulfill a requested application function is present in the secure internal memory. The external code may be loaded any number of times or never (i.e. 0 to n times) during an application function request from the system. The integrity and confidentiality of the code loaded from external memory is protected in embodiments of the invention.

Embodiments of the invention keep the footprint for internal secure memory as small as possible while allowing the system to use the functionality of a security application that cannot be held completely in internal secure memory.

Embodiments of the invention do not require an increase in the secure internal memory resources when the secure application's functionality is enhanced and, therefore, allow for scalable application enhancement, without increasing the cost of internal secure memory.

Additionally, embodiments of the invention do not require that the internal secure memory be flash or EEPROM memory, which allows for process optimization and manufacturing cost saving.

An embodiment of the invention is directed to a system comprising a fragmentation manager coupled to an application store; an external memory interface coupled to the fragmentation manager, the fragmentation manager obtaining a required code fragment from an external memory via the external memory interface, if the required code fragment is not present in the application store; a cryptographic engine coupled to the application store and a secure key store, the cryptographic engine decrypting the required code fragment, if necessary, using the secure key and verifying the integrity of the code fragment; and an execution engine coupled to the cryptographic engine and application store, the execution engine executing a decrypted code fragment.

The system may further comprise a system interface coupling a system application command to the fragmentation manager. The system application command may be an authentication operation request, key management command, secure storage command, secure platform reporting command or secure boot operation. The system may further comprise a system interface coupling the fragmentation manager to a central processing unit on a Printed Circuit Board (PCB), such as a mainboard or computer motherboard. The fragmentation manager may determine if the required code fragment is present in the application store. A memory management unit may be coupled to the execution engine. A hash engine may provide integrity verification for decrypted code fragments. The external memory interface may be a flash memory interface coupled to an external flash memory or a disk drive interface coupled to an external magnetic memory or optical storage device. Other non-volatile memory (NVM) may be used for the external memory, such as flash memory, Electrically Erasable Programmable Read-Only Memory (EEPROM), Erasable Programmable Read-Only Memory (EPROM); Magnetic RAM (MRAM), Ferroelectric RAM (FeRAM); Programmable Metallization Cell (PMC), or Phase-change Memory (PCM). The appropriate external memory interface would be used with the selected external memory format.

The fragmentation manager may comprise logic implemented in non-volatile memory. The application store may comprise volatile storage, such as SRAM or DRAM. The secure key store may comprise non-volatile memory, such as one-time programmed memory, battery buffered RAM, or flash memory.

In another embodiment, a method for providing secure application functionality comprises receiving a request for a secure operation; determining if a required application code fragment for the secure operation is present in an application fragment store; loading the required application code fragment from an external memory, if the required application code fragment is not present in the application fragment store; decrypting the required application code fragment using a secure key; executing the decrypted required application code fragment; and sending a reply to the request for the secure operation.

The request for a secure operation may originate from a central processing unit on a Printed Circuit Board (PCB), such as a computer motherboard. The secure operation may be an authentication operation, key management command, secure storage command, secure platform reporting command or secure boot operation. The request for the secure operation may originate during a boot function.

The external memory may be a flash memory device or a magnetic memory device. The method may further comprise loading a second required application code fragment from the external memory, if the second required application code fragment is not present in the application fragment store; decrypting the second required application code fragment using the secure key and verifying the integrity of the code fragment; and executing the second decrypted required application code fragment.

Embodiments comprise a system and method for providing secure application functionality comprising receiving a request for a secure operation; determining if required application code for the secure operation is present in an application fragment store; sequentially loading a plurality of fragments of the required application code from an external memory, if the required application code is not present in the application fragment store; sequentially executing the plurality of fragments of the required application code; and sending a reply to the request for the secure operation. The system and method may further comprise decrypting each of the plurality of fragments of the required application code using a secure key and verifying the integrity of the code fragment, prior to execution of the fragment.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
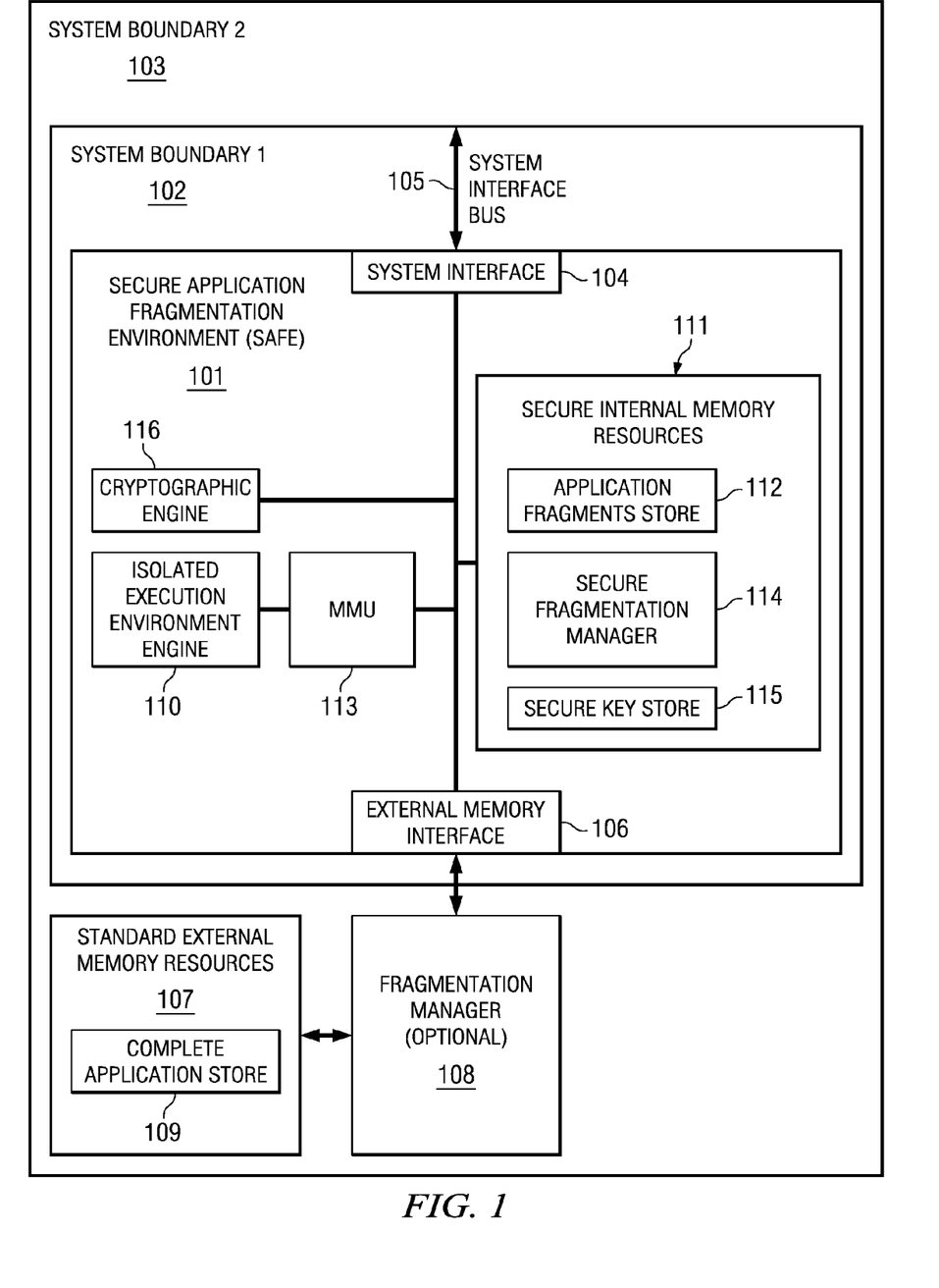
FIG. 1 illustrates a high-level block diagram of one embodiment of a secure application fragmentation environment.

FIG. 1 shows a high-level block diagram of one embodiment of a secure application fragmentation environment (SAFE) 101, which may be configured to operate within system 102 and system 103. In one embodiment, external system 103 requests functions offered by the secure application running on SAFE 101. SAFE 101 may be a discrete component, such as an integrated circuit (IC) or chip, that is mounted on system 102. Alternatively, SAFE 101 may be an integral component or functional block that is constructed as part of system 102. For example, system 102 may be a system-on-chip, baseband chipset, Southbridge chipset, or other component. SAFE 101 may be embodied in hardware or software depending upon design needs.

System interface 104 provides a link from SAFE 101 to external system 103, such as via system interface bus 105. For example, system interface 104 may be an interface to a peripheral bus on a baseband chipset or Southbridge chipset.

External memory interface 106 provides an interface to standard external memory resources 107 via optional fragmentation manager 108. For example, external memory interface 106 may be a standard interface to a flash memory and fragmentation manager 108 may be a Serial Peripheral Interface (SPI) or LPC bus or flash memory bus that provides access to memory resources 107, which may be flash memory. External memory resources 107 may also be a hard drive, magnetic memory, or other non-flash memory storage. Complete application store 109 on external memory resources 107 stores the secure application code, such as TPM 1.2 or MTM application code. External memory interface 106 provides access to the external application code in application store 109. In some embodiments, system interface 104 and external memory interface 106 may be identical.

Isolated execution environment engine (IEEE) 110 executes secure fragmentation manager logic and application fragment code. For example, IEEE 110 may execute application-specific functions for a TPM 1.2 or MTM application. In one embodiment, system 103 requests execution of a secure application function via system interface 104. An application fragmentation algorithm detects if the requested functionality of the secure application is available on secure internal memory resources 111. If the code is not already available internally, then the code is dynamically and securely loaded from standard external memory resource 107 into application fragments store (AFS) 112 via external memory interface 106. The loading may be performed 0 to n times, until the requested functionality of the secure application is fully provided. The code may be executed from application fragments store 112. In some embodiments, depending upon the fragmentation algorithm, memory management unit (MMU) 113 may support the fragmentation algorithm.

Secure fragmentation manager (SFM) 114 detects if external code needs to be loaded into the application fragment store 112. SFM is executed on the internal computing secure resources in an isolated execution environment. When loading code from complete application store 109, only confidential and integrity-protected code is allowed to be loaded. Secure fragmentation manager 114 has access to secure key store (SKS) 115 in which integrity and confidentiality cryptographic keys are stored. The secure keys may be unique for each system, be the same for a group of systems, or be global for all systems. Secure fragmentation manager 114 also has access to cryptographic engine 116, which performs the relevant cryptographic operations on the secure keys from secure key store 115. Cryptographic engine 116 verifies the integrity of and decrypts the externally loaded code.

In some embodiments, some core functions of the secure application may be permanently available on the secure internal memory resources. In other embodiments, an external non-secure fragmentation manager (FM) may execute on external system 103 (not shown).

In embodiments of the invention, the complete application code must be authenticated by a secure application provider (SAP) (not shown). The entity performing the authentication check and installing the complete application in the complete application store, located in standard external memory resources is called the secure update manager (SUM) (not shown). The SUM, after authentication of the complete application, will protect the integrity and confidentiality of the complete application code in the external complete application store using the same algorithm and key policy that SFM 114 uses to load the code.

SFM 114 provides a method for securely loading external application code fragments and provides a method for detecting if a required functionality of the application is available within the SAFE based on an application fragmentation algorithm. The application fragmentation algorithm may be based on one of the following policies:

1) Applications Feature Policy—for example, in a TPM 1.2 or MTM module, a feature would be represented by a group of commands;

2) Application Command Policy—for example, in a TPM 1.2 or MTM module, a single command would be represented by the TPM_LoadKey command;

3) Isolated Execution Environment Engines Internal Architecture Policy—for example, a banking switching mechanism, in which case a Memory Management Unit is required;

4) Isolated Execution Environment Engines Code-based Policy—for example, a secure caching mechanism, which would require a Memory Management Unit; or 5) Any other Policy In one embodiment, securely loading an external application fragment is performed as follows: accessing external complete application store 109 via standard external memory interface 106, accessing secure key store 115 to retrieve confidentiality and integrity protection keys; accessing cryptographic engine 116 to perform an integrity verification check and confidentiality operation on the externally loaded application fragment code; and accessing secure replay policy data, which ensures that only application code fragments belonging to an application version, approved in the secure replay policy data, are allowed to be loaded. The secure keys may be unique for each system, they may be the same for a group of systems, or they may be global for all systems.

In another embodiment, the system of FIG. 1 may be used as follows. System 103 requests an application-specific function over system interface bus 105. For example, the request may be a TPM load key request or a request to perform a signature. AFS 112 and IEEE 110 determine if the required code is already present in secure internal memory resources 111. If the required code is not present, then SFM 114 loads the code from external memory resources 107. Once the code is present, the requested application function is performed and the result is sent back to system 103. The application code may be loaded in fragments sized to fit the available internal memory resources 111.

Embodiments of the invention allow internal memory, such as SRAM, to be small. The SAFE system does not have to maintain the security application code, but may load the code from external memory. The code may be loaded all at one time or in fragments. A specific function may be loaded from external memory, or a sequence of codes or instructions may be loaded as they are needed. Using embodiments of the invention, the logic required to provide a secure application may increase without requiring a corresponding increase in the size of internal memory. During operation, while one operation is being performed, SFM 114 may determine that the required code for a next operation is not available in AFS 112. SFM 114 may then load the next required code to AFS 112, and SAFE 101 runs the rest of the command when the first code is complete.

Keys stored in secure key store 115 may be associated with encryption of external memory resources 107. The data or code stored in standard external memory resources 107 may be encrypted so that it is not useable or readable by other devices. Accordingly, although other devices might access the data and secure application code in standard external memory resources 107, the contents of such data would be protected from disclosure. Cryptographic engine 116 uses a secure key from SKS 115 to decrypt the protected code that is loaded by SFM 114. The decrypted code is then used by IEEE 110, for example, to provide a requested function. In embodiments of the invention, SFM 114 is the master device that controls and configures cryptographic engine 116 to use the correct key from SKS 115. SFM 114 moves the data between cryptographic engine 116 and IEEE 110, which runs the decrypted code. Upon executing the code in IEEE 110, the resulting data, output or reply is sent back to system 102 and/or 103.

For example, SAFE 101 may be used in a authentication or verification application. An application on system 103 may send a user-entered personal identification number (PIN) to SAFE 101 for verification or authentication. SAFE 101 requires the proper secure application code to perform authentication. The required authentication application code may be stored in encrypted form in standard external memory 107. SFM 114 may load fragments of the authentication code to AFS 112 and/or decrypt the known PIN data using cryptographic engine 116 and a key from SKS 115. IEEE 110 then executes the decrypted code to perform the authentication operation. If the PIN data is verified or authenticated, then a true or positive response may be sent back to the application on system 103, without needing to send the secure authentication application code to system 103. Accordingly, the secure code in standard external memory resources 107 stays secure. Any additional memory storage is handled by standard external memory resources 107.

Figure 2:
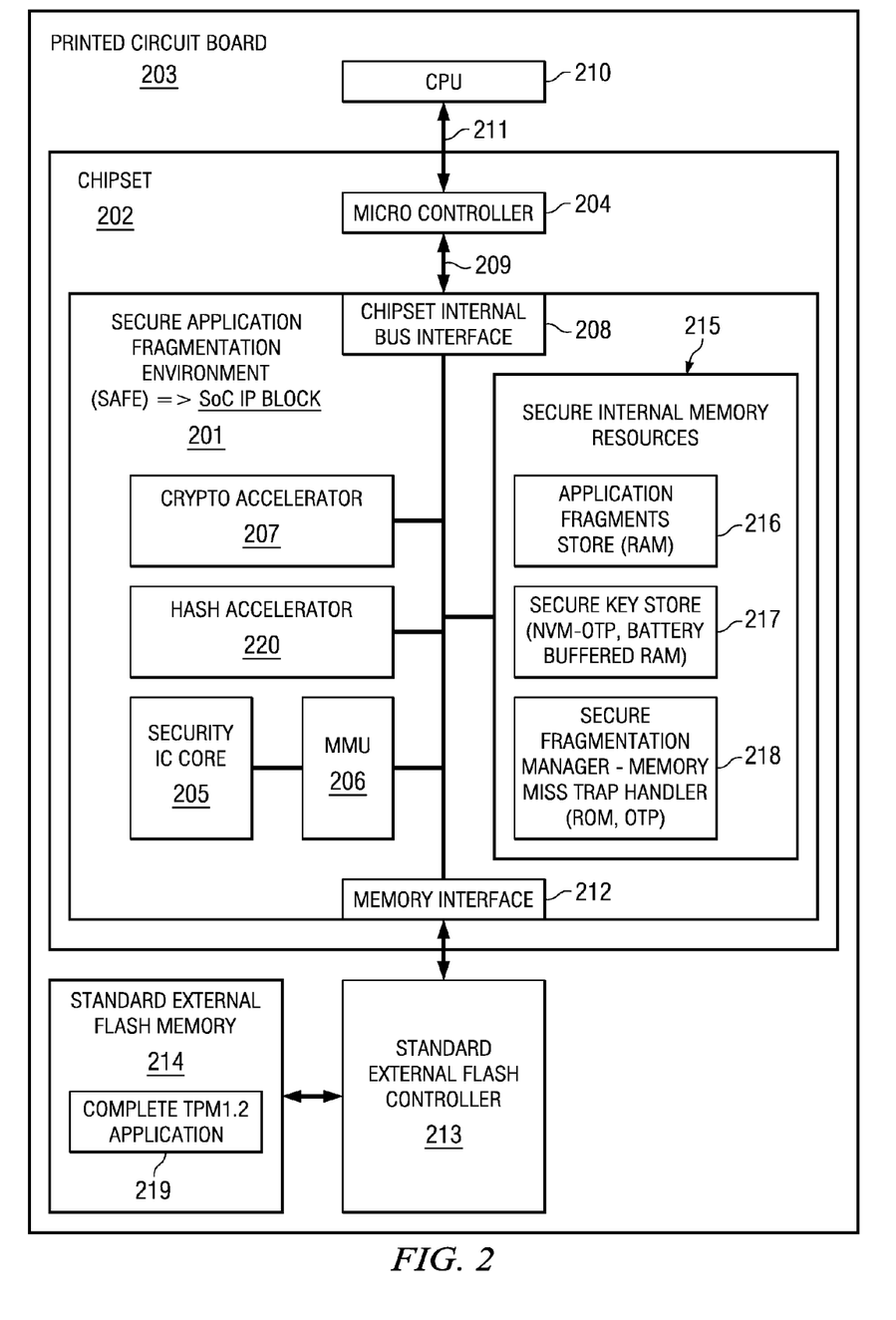
FIG. 2 illustrates a high-level block diagram of another embodiment of a secure application fragmentation environment.

FIG. 2 illustrates secure application fragmentation environment (SAFE) 201 which is embodied as a system-on-chip or synthesized as a functional block or intellectual property (IP) block on chipset 202. FIG. 2 illustrates a logical environment instead of a physical layout of SAFE 201. For example, SAFE 201 may be a functional block within a Southbridge chipset, I/O controller hub or baseband controller. Chipset 202 may be mounted on printed circuit board (PCB) 203, such as a motherboard for a personal computer. Microcontroller 204 is another functional block in chipset 202 that controls the operation of chipset 202, including SAFE 201.

SAFE 201 comprises similar components to SAFE 101 (FIG. 1). Isolated execution environment engine 110 may be embodied as an IC core 205 or microcontroller including Memory Management Unit 206. In one embodiment, features of the Infineon Security Controller Family SLE76 may be used to provide IC core 205 and/or MMU 206. Cryptographic accelerator may be embodied as crypto accelerator 207, such as an AES Crypto Accelerator. Crypto accelerator 207 may perform encryption and decryption functions. Hash accelerator 220 may be used for integrity verification of the code fragment. Integrity verification may be performed before or after decryption. In one embodiment, a cryptographic engine for code confidentiality may be based on the AES128 Algorithm, with CBC mode of operations or a similar algorithm with the same bits of security. A cryptographic engine for code integrity may be based on SHA256 or a similar algorithm with the same bits of security.

Chipset internal bus interface 208 provides an interface to bus 209, which links SAFE 201 to chipset microcontroller 204. Central processing unit (CPU) 210 is also mounted on PCB 203. Bus 211 links chipset microcontroller 204 to CPU 210. External memory interface 212 may be an SPI interface that couples SAFE 201 to flash controller 213 and external flash memory 214.

Secure internal memory resources 215 comprises application fragments store (AFS) 216, secure key store (SKS) 217, and secure fragmentation manager (SFM) 218. AFS 216 may be embodied as SRAM memory on chipset 202. SKS 217 may comprise data implemented in NVM, one-time programmed (OTP) memory, battery-buffered RAM, or a combination of memory types. SFM 218 may be embodied as logic implemented in ROM or OTP memory. NVM, OTP, and RAM memory is incorporated into chipset 202. Flash memory 214 is external to chipset 202 and may be expanded or replaced with a bigger flash memory, if required, to hold data and/or application code, such as TPM 1.2 or MTM application 219.

Figure 3:
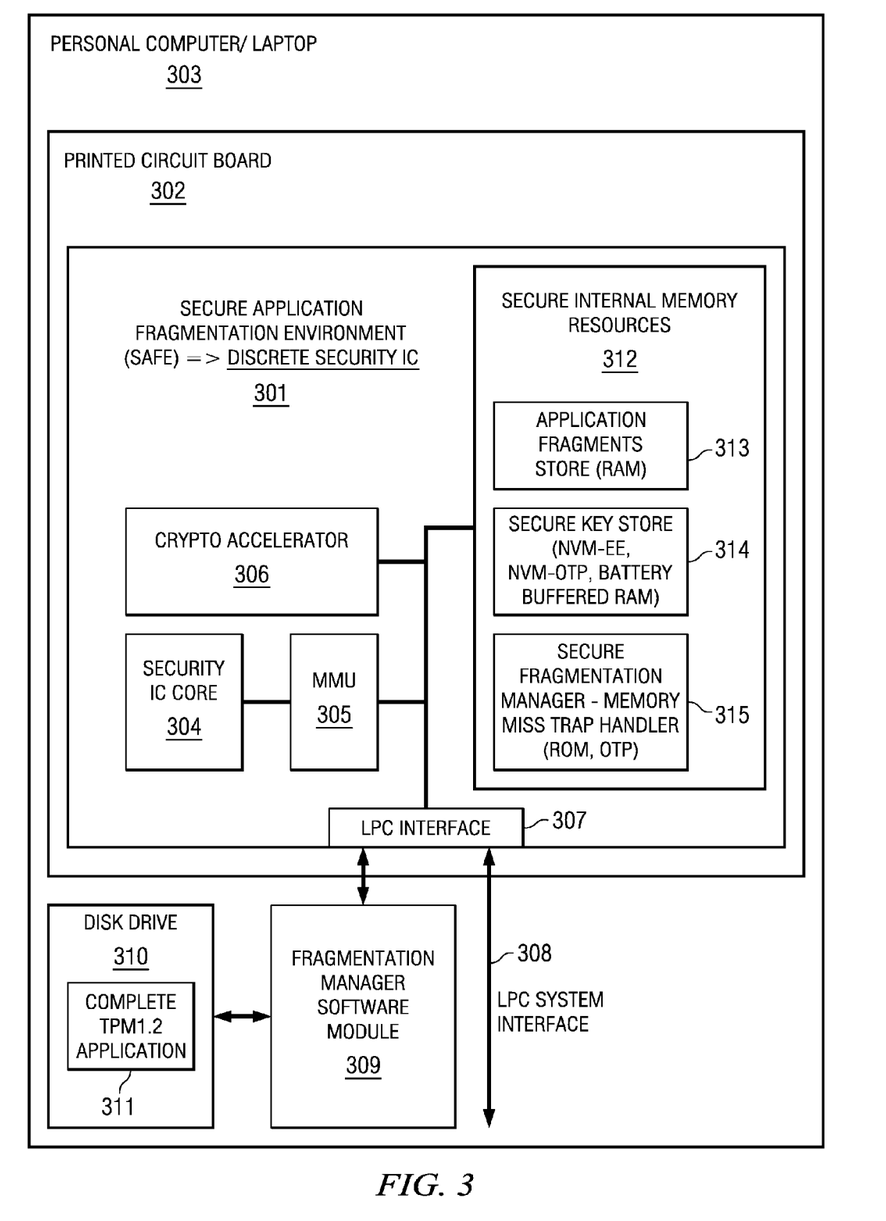
FIG. 3 illustrates a high-level block diagram of another embodiment of a secure application fragmentation environment.

FIG. 3 illustrates another embodiment of the invention in which Secure Application Fragmentation Environment (SAFE) 301 is embodied as a discrete security IC (DSIC) mounted on Printed Circuit Board (PCB) 302, such as a mainboard or motherboard, within personal computer or laptop 303. The embodiment illustrated in FIG. 3 is a discrete SAFE component, unlike the SAFE functionality that is integral to chipset 202 in FIG. 2.

SAFE 301 comprises isolated execution environment engine 304, which may be embodied as an IC core or microcontroller, such as an Infineon Security IC Core, including Memory Management Unit 305. Cryptographic accelerator may be embodied as crypto accelerator 306, such as an AES Crypto Accelerator. Crypto accelerator 306 may perform encryption and decryption functions. A hash engine (not shown) may be used for integrity verification of code, if needed.

LPC bus interface 307 provides a system interface to PCB 302 via LPC system interface bus 308. LPC bus interface 307 also provides a standard external memory interface to external fragmentation manager 309, which may be a software module providing management of application fragment retrieval and storage to disk drive 310. As shown in the embodiment of FIG. 3, the standard external memory resource may be a disk drive or any other memory device in addition of the flash memory illustrated in the other exemplary embodiments. Disk drive 310 may store secure application data and code, such as TPM 1.2 application data 311.

Secure internal memory resources 312 comprises application fragments store (AFS) 313, secure key store (SKS) 314, and secure fragmentation manager (SFM) 315. AFS 313 may be embodied as RAM memory on DSIC 301, for example. SKS 314 may comprise data implemented in NVM, such as, OTP, battery-buffered RAM, or a combination of memory types. SFM 315 may be embodied as logic implemented in NVM, such as ROM or OTP memory. The NVM, OTP, and RAM memory incorporated into IC 301.

In other embodiments, the SAFE may be implemented as a security IC on a mobile platform, such as a device located between a System On Chip (SoC) and an external memory component.

Figure 4:
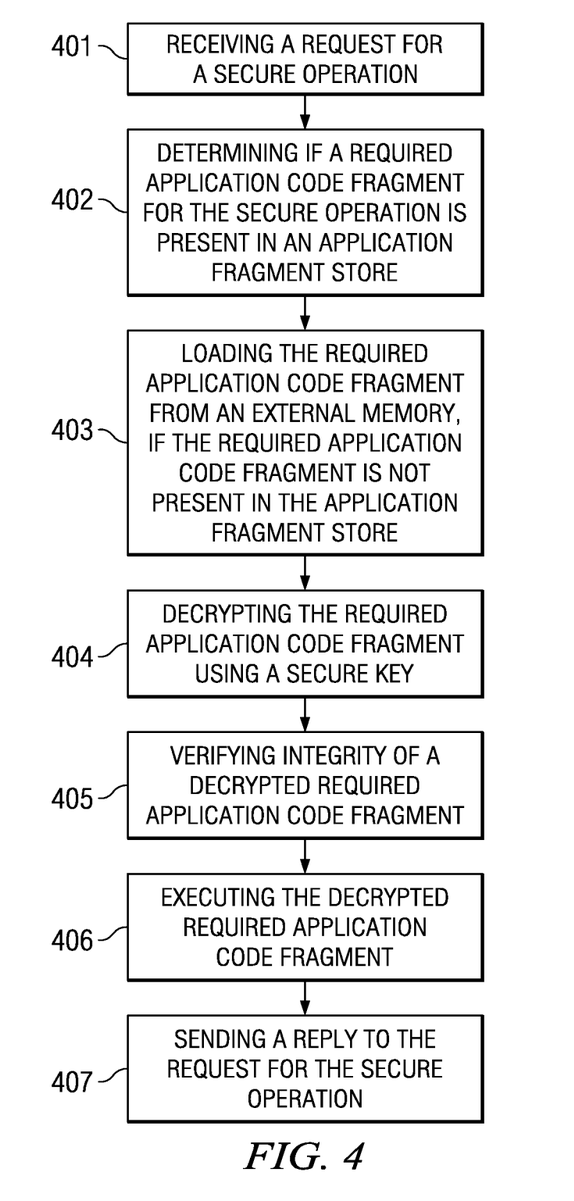
FIG. 4 illustrates a flowchart for an exemplary embodiment of a method for providing secure application functionality.

FIG. 4 illustrates a flowchart for an exemplary embodiment of a method for providing secure application functionality. The method illustrated in FIG. 4 may be implemented, for example, using secure application fragmentation environments 201, 301, 401 (FIGS. 1-3), but is not intended to be limited to such configurations. Moreover, it will be understood that the steps of the method illustrated in FIG. 4 may be performed in the order indicated, or in any other order, or simultaneously, or in conjunction with other steps or methods. In step 401, a request for a secure operation is received. In embodiments of the invention, the request for a secure operation originates from a central processing unit on a Printed Circuit Board (PCB), such as a computer motherboard or a microcontroller on an SoC. The secure operation may be an authentication operation, key management command, secure storage command, secure platform reporting command or secure boot operation. The request for the secure operation may originate during a boot function. In step 402, a determination is made whether a required application code fragment for the secure operation is present in an application fragment store. In step 403, the required application code fragment is loaded from an external memory, if the required application code fragment is not present in the application fragment store. The external memory may be a flash memory device or a magnetic memory device, for example. In step 404, the required application code fragment is decrypted using a secure key. In step 405, the integrity of a required application code fragment is verified. In step 406, the decrypted required application code fragment is executed. In step 407, a reply to the request for the secure operation is sent.

Embodiments of the method may further comprise loading a second required application code fragment from the external memory, if the second required application code fragment is not present in the application fragment store; decrypting the second required application code fragment using the secure key and verifying the integrity of the code fragment; and executing the second decrypted required application code fragment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a system interface configured to receive a request for a secure operation;
   an external memory interface;
   an application fragments store configured to store code fragments;
   a secure fragmentation manager, the secure fragmentation manager configured to obtain the code fragments for the secure operation from an external memory via the external memory interface, and further configured to determine whether or not the code fragments for the secure operation are in the application fragments store, the secure fragmentation manager being coupled to the system interface, the external interface and the application fragments store;
   a cryptographic engine coupled to the application fragments store and a secure key store, the cryptographic engine configured to decrypt the code fragment for the secure operation using a secure key and verifying an integrity of the code fragment for the secure operation; and
   an execution engine coupled to the cryptographic engine and the application fragments store, the execution engine configured to execute the code fragments for the secure operation,
   wherein the execution engine executes a first code fragment for the secure operation while the secure fragmentation manger simultaneously obtains a second code fragment for the secure operation.

2. The system of claim 1, wherein size of the application fragments store is selected based upon a minimum useable code fragment size.

3. The system of claim 1, wherein the system interface is configured to receive a system application command to the secure fragmentation manager.

4. The system of claim 3, wherein the system application command is an authentication operation request, a key management command, a secure storage command, a secure platform reporting command or a secure boot operation.

5. The system of claim 1, wherein the secure fragmentation manager, the application fragments store, the cryptographic engine and the execution engine are part of a secure application fragmentation environment (SAFE), wherein the system interface couples the SAFE to a central processing unit on a Printed Circuit Board (PCB).

6. The system of claim 1, wherein the secure fragmentation manager, the application fragments store, the cryptographic engine and the execution engine are part of a secure application fragmentation environment (SAFE), the SAFE residing in a system on a chip (SoC), and wherein the system interface couples the SAFE to a microcontroller on the SoC.

7. The system of claim 1, wherein the secure fragmentation manager determines when the required code fragment is present in the fragments application store.

8. The system of claim 1, further comprising:
   a memory management unit coupled to the execution engine and to the secure fragmentation manager.

9. The system of claim 1, further comprising:
   a hash engine providing the integrity verification for code fragments for the secure operation.

10. The system of claim 1, wherein the external memory is a non-volatile memory (NVM).

11. The system of claim 10, wherein the NVM comprises flash memory; Electrically Erasable Programmable Read-Only Memory (EEPROM); Erasable Programmable Read-Only Memory (EPROM); Magnetic RAM (MRAM); Ferroelectric RAM (FeRAM); Programmable Metallization Cell (PMC); or Phase-change Memory (PCM).

12. The system of claim 11, wherein the external memory interface is a disk drive interface.

13. The system of claim 12, further comprising:
   an external magnetic memory or optical storage device.

14. The system of claim 1, wherein the secure fragmentation manager comprises logic implemented in non-volatile memory.

15. The system of claim 1, wherein the application fragments store comprises volatile memory.

16. The system of claim 15, wherein the volatile memory comprises SRAM or DRAM.

17. The system of claim 1, wherein the secure key store comprises a non-volatile memory (NVM).

18. The system of claim 17, wherein the NVM comprises a one-time programmable (OTP) memory, a battery buffered RAM, or a flash memory.

19. A method for executing a secure application, comprising:
   receiving a request for a secure operation;
   executing a first application code fragment for the secure operation;
   simultaneously with executing the first application code fragment, determining whether or not a second application code fragment for the secure operation is present in an application fragments store and when the second application code fragment is not present in the application fragments store:

loading the second application code fragment from an external memory;

decrypting the second application code fragment using a secure key; and verifying an integrity of a second application code fragment;

executing the decrypted second application code fragment; and sending a reply to the request for the secure operation.

20. The method of claim 19, wherein the request for a secure operation originates from a central processing unit on a Printed Circuit Board or a microcontroller on a system on a chip (SoC).

21. The method of claim 19, wherein the external memory is a non-volatile memory (NVM) device.

22. The method of claim 19, wherein the external memory is a magnetic memory device or an optical storage device.

23. The method of claim 19, wherein the secure operation is an authentication operation request, a key management command, a secure storage command, a secure platform reporting command or a secure boot operation.

24. The method of claim 19, wherein the request for the secure operation originates during a boot function.

* * * * *